UNITED STATES PATENT OFFICE.

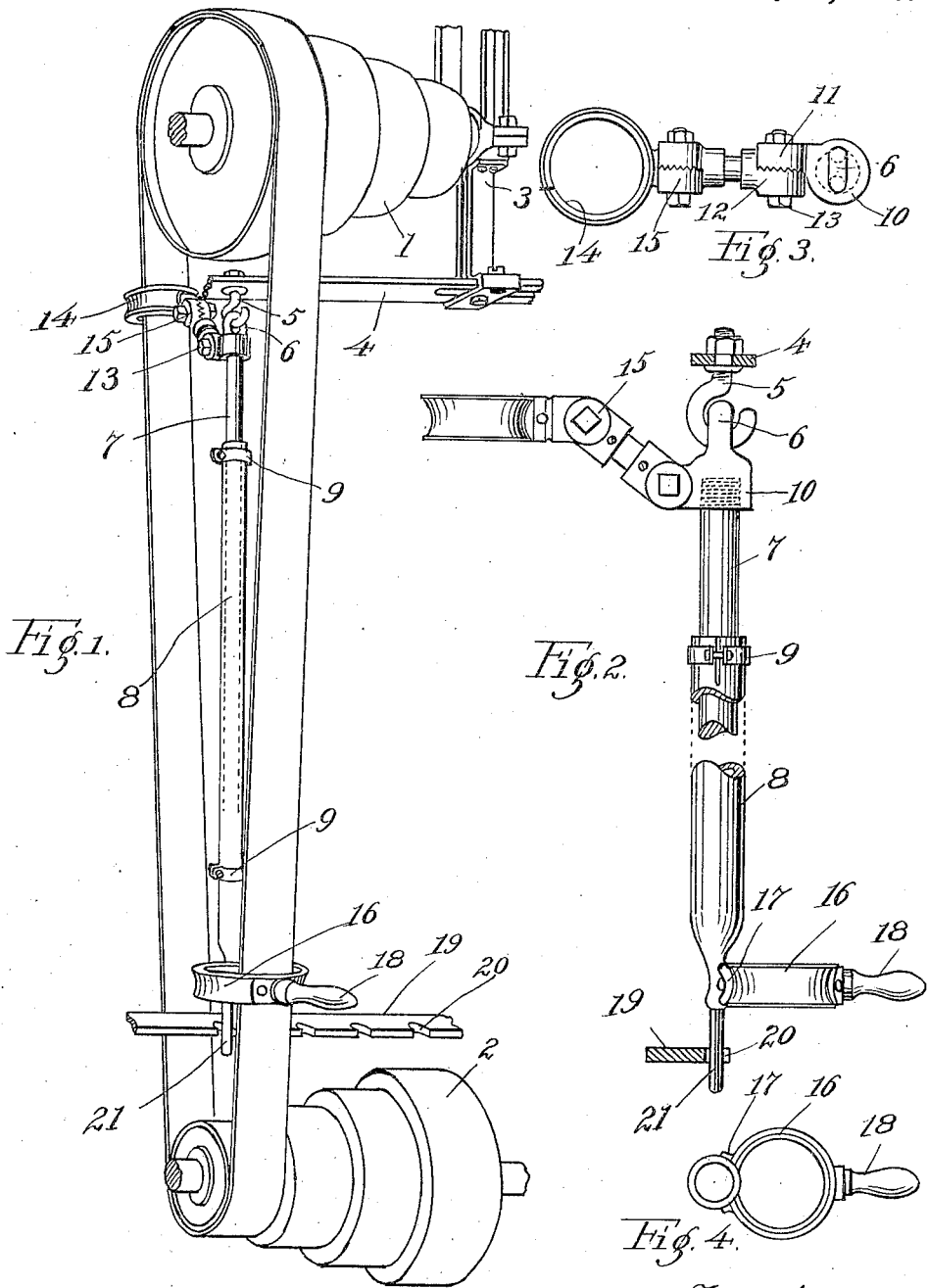

GEORGE A. REEVE, OF MIDDLETOWN, OHIO.

BELT-SHIFTER.

1,341,440.　　　Specification of Letters Patent.　　Patented May 25, 1920.

Application filed July 16, 1919. Serial No. 311,146.

*To all whom it may concern:*

Be it known that I, GEORGE A. REEVE, a citizen of the United States, and a resident of Middletown, in the county of Butler and State of Ohio, have invented certain new and useful Improvements in Belt-Shifters, of which the following is a full, clear, and exact description, reference being had to the accompanying drawings, forming part of this specification.

My invention relates to belt shifters of both large and small types, and has as its object the provision of a simple and effective device for the said purpose.

In belt shifters in general, the difficulty of operation is due to the complication of the necessary elements in shifting the belt at both pulleys, and it is one of my objects to simplify the necessary movements by providing a device which has under the control of one handle a rotary and also a swinging movement, so that the operator can first revolve and then swing, or first swing and then revolve, as is most convenient. In this connection further I provide a simple form of rest for the belt shifter bar, which enables me to provide a pivot point for the rotary movement, and serves also to hold the belt engaging forks or rings, from resting on the belt during the operation thereof.

It is my further object to provide a readily adjustable structure, which will be adapted for a large variety of belts, and generally to arrange the parts of my device in the most simple and durable way, thereby gaining the greatest efficiency.

These objects and other advantages I accomplish by that certain construction and arrangement of parts to be hereinafter more specifically pointed out and claimed.

In the drawings,

Figure 1 is a perspective view of the belt shifter in operation.

Fig. 2 is a detail elevation thereof.

Fig. 3 is a plan view of the adjustable upper ring arm.

Fig. 4 is a plan view showing the method of attachment of the lower ring and handle.

The two cone pulleys 1 and 2 are shown in the drawings, with the upper pulley having a bracket 3 and a cross plate 4, for supporting the upper end of the shifter bar, said bracket to be suitably mounted at any convenient point. The cross plate should extend a sufficient distance to bring the pivot of the shifter bar somewhere adjacent the center of the upper cone pulley.

This pivot is preferably supplied by means of a hook bolt 5, which is rotatably held in the said cross plate. On the hook is held a ring or eye 6 to which is secured the shifter bar.

The shifter bar is preferably made extendible, and has the inner telescoping member 7 and the outer telescoping member 8, which two members are held together in any adjusted position by means of clamping rings 9. The outer member is preferably slotted adjacent the clamping rings to permit of sufficient compression to hold the members tightly together.

The method of applying the eye 6 to the inner member 7 of the shifter bar is preferably to combine the connection with the upper belt shifter arm. This arm accordingly has a socket portion 10 which screws over the end of the member 7 and carries the eye 6. This socket portion has a toothed bearing plate 11 to which is adjustably held another like plate 12, by means of a bolt 13. I prefer to form the upper belt engaging ring 14 with a further adjustable connection 15, with like toothed disks and a retaining bolt, so that there are two knuckles which may be adjusted in positioning the upper ring with regard to the shifter bar.

The lower ring 16 is held to the outer telescoping member of the shifter bar by means, preferably, of forming the metal so as to provide a convex face 17, which may be welded in the concave periphery of the said ring. The lower ring has an operating handle 18, of any suitable type.

The above parts by themselves, with or without the adjustable features noted may comprise the whole of the belt shifter, and embodies the main point of my invention. As so constructed, the operation of the shifter will be to grasp the handle 18 and rotate the shifter bar. This will result in moving the upper belt retaining ring in a horizontal arc, and thus will move the belt away from one step on the cone pulley to another step. The operator will then swing the lower ring in a vertical arc (*i. e.* an arc in a vertical plane) which will shift the belt from one step to another of the lower pulley. In operation, it will be easier, as is the case with all shifters, to move the belt away from the largest pulley with which it is in engagement rather than from the smaller, as this gives a slack belt during the majority of the shifting movement.

To facilitate the revolving movement and to hold the belt shifter in a position where it will not be hanging against the belt during its operation, I provide preferably a plate 19 which is suitably mounted so as to extend horizontally across the space above the lower cone pulley. This plate has a series of notches 20 therein, preferably located adjacent the lines to be taken by the belt while engaging each of the stepped members of the pulley.

The shifter bar has an extension 21, of preferably cylindrical shape, which is of a size to fit in said notches so as to become readily engaged thereby.

In operating the device with the assistance of the notched plate and the extension to the shifter bar, the operator will primarily seat the extension in the desired one of the notches prior to attempting to revolve the shifter bar. Thus when shifting from a large step to a smaller one in the lower pulley, the shifter bar will first be swung over to a position to bring the belt to the smaller step, and then seat the cylindrical extension or arm 21 in the closest adjacent notch. He can then exert all his force on the revolving of the shifter bar, by utilizing the notch as a fulcrum for the motion imparted by the handle 18.

Any plate with or without notches would serve to assist the operator in the revolving motion of the shifter bar, but the notches are, as is obvious, an additional assistance in providing a seat for the arm 21 on the shifter bar.

While I have described and shown my device with considerable particularity, it is not my desire that the scope of the claims that follow be limited beyond the plain meaning of their words. I, in fact, desire the full application of the doctrine of equivalents in the construction thereof.

Among other things, it will be noted that by my device I provide for two motions to a belt shifter bar, one to impart an arc in a horizontal plane to a belt engaging arm, and the other to impart an arc in a vertical plane to another belt engaging arm. In other words, I provide a belt shifter which has a rotary and a swinging movement under the control of a single handle. While the structure shown is my preferred form, I wish it understood that a swiveled hook and eye, or any universal joint, a piece of pipe, two rings and a handle will be sufficient parts with which to make up an efficient belt shifter according to the principle of my invention. Although shown vertically disposed, the shifter bar might readily be horizontal.

Having thus described my invention, what I claim as new and desire to secure by Letters Patent, is:

1. In a belt shifter, a shifter bar having a swiveled and a swinging movement, and belt engaging means on said bar, one of said means to operate the belt during a swiveled movement and the other during a swinging movement of the said bar.

2. In a belt shifter, a movable shifter bar having a connection adjacent a pulley member adapted to permit of movement in two planes, a belt engaging element adjacent said connection, another belt engaging element at another point on the bar, adjacent another pulley member, and a handle on said bar for operating the same, one of said engaging elements being adapted to act upon the bar movement in one plane and the other engaging element adapted to act upon bar movement in the other plane.

3. The combination in a belt shifter, of a shifter element adapted to move in an arc in a horizontal plane, and another shifter element adapted to move in an arc in a vertical plane, and a common operator for said two elements.

4. In a belt shifter, a movable shifter bar having a combined swiveled and swinging support, a belt engaging element on said bar adapted to shift a belt upon the swiveled motion of the bar, another belt engaging element adapted to shift the belt upon the swinging motion of the bar, a handle for the bar, and a rest for the bar for providing a fulcrum for the swiveled movement thereof.

5. In a belt shifter, a movable shifter bar having a combined swiveled and swinging support, a belt engaging element on said bar adapted to shift a belt upon the swiveled motion of the bar, another belt engaging element adapted to shift the belt upon the swinging motion of the bar, a handle for the bar, and a rest for the bar for providing a fulcrum for the swiveled movement thereof, said handle being part of the last mentioned belt engaging element.

6. In a belt shifter, an extendible shifter bar to be mounted adjacent a pulley and having a mounting means adapted to permit both swiveled and swinging movements thereof, a ring secured to the bar adjacent said mounting means for engaging over a belt, another ring secured at the opposite end of the bar from the first ring, for a like purpose, and a handle for operating the bar secured to the last mentioned ring.

7. In a belt shifter, a movable shifter bar having a combined swiveled and swinging support, a belt engaging element on said bar adapted to shift a belt upon the swiveled motion of the bar, another belt engaging element adapted to shift the belt upon the swinging motion of the bar, a handle for the bar, and a rest for the bar for providing a fulcrum for the swinging movement thereof, said rest being positioned so as to hold the shifter out of substantial contact with the belt while in operation.

8. In a belt shifter, a movable shifter bar having a combined swiveled and swinging support, a belt engaging element on said bar adapted to shift a belt upon the swiveled motion of the bar, another belt engaging element adapted to shift the belt upon the swinging motion of the bar, a handle for the bar, and a rest for the bar for providing a fulcrum for the swinging movement thereof, said rest being positioned so as to hold the shifter out of substantial contact with the belt while in operation, and comprising a notched bar, having its notches located to receive the shifter bar, in positions assumed when the belt is in operative positions.

9. In a belt shifter, the combination with a pair of reversely stepped pulleys, of a support located adjacent the central portion of the one pulley, and a rest located adjacent the other pulley, a shifter bar, means for providing a swiveled and a swinging connection for the bar with the said support, an arm carrying a belt engaging element adjacent said connection, another belt engaging element adjacent the rest, and a handle for the bar, for the purpose described.

10. In a belt shifter, the combination with a pair of reversely stepped pulleys, of a support located adjacent the central portion of the one pulley, and a rest located adjacent the other pulley, of a swiveled hook in the support, a shifter bar having an eye for engaging over the hook, and belt engaging means at either end of the bar located adjacent the two pulleys, for the purpose described.

GEORGE A. REEVE.